(12) United States Patent
Belcher et al.

(10) Patent No.: US 6,476,719 B2
(45) Date of Patent: Nov. 5, 2002

(54) ULTRA-SENSITIVE MAGNETIC FIELD RECEIVER CAPABLE OF OPERATING IN HIGH NOISE ENVIRONMENTS

(75) Inventors: Donald K. Belcher, Rogersville, TN (US); John A. Eisenberg, Los Altos, CA (US); Ronald J. Hash, Rogersville, TN (US); Douglas C. Bowman, Capitola, CA (US)

(73) Assignee: Wherenet Corp., Santa Clara, CA (US)

( * ) Notice: Subject to any disclaimer, the term of this patent is extended or adjusted under 35 U.S.C. 154(b) by 0 days.

(21) Appl. No.: 09/800,079

(22) Filed: Mar. 6, 2001

(65) Prior Publication Data

US 2002/0135479 A1 Sep. 26, 2002

Related U.S. Application Data

(63) Continuation-in-part of application No. 09/759,290, filed on Jan. 11, 2001
(60) Provisional application No. 60/187,573, filed on Mar. 7, 2000.

(51) Int. Cl.[7] .............................................. G08B 13/14
(52) U.S. Cl. ..................... 340/572.1; 340/525; 342/126
(58) Field of Search ............................. 340/572.1, 551, 340/539, 525; 342/450, 126

(56) References Cited

U.S. PATENT DOCUMENTS

| | | | |
|---|---|---|---|
| RE32,627 E | 3/1988 | Humble et al. | 340/572 |
| 5,103,459 A | 4/1992 | Gilhousen et al. | 375/1 |
| 5,432,841 A | 7/1995 | Rimer | 379/59 |
| 5,481,588 A | 1/1996 | Rickli et al. | 379/32 |
| 5,485,632 A | 1/1996 | Ng et al. | 455/51.2 |
| 5,561,701 A | 10/1996 | Ichikawa | 379/57 |
| 5,644,108 A | 7/1997 | Katsurahira et al. | 178/18 |
| 5,920,261 A | * 7/1999 | Hughes et al. | 340/525 |
| 5,920,287 A | 7/1999 | Belcher et al. | 342/450 |
| 5,995,046 A | 11/1999 | Belcher et al. | 342/450 |

* cited by examiner

Primary Examiner—John Tweel
(74) Attorney, Agent, or Firm—Allen, Dyer, Doppelt, Milbrath & Gilchrist, P.A.

(57) ABSTRACT

The unwanted influence a noise-source environment upon a modulated (e.g., FSK-encoded) magnetic field-based communication system is diminished by a non-modulated AC magnetic field communication scheme that uses a demodulatorless magnetic field detector. When installed in a tag to be tracked by a geolocation system, the demodulatorless detector responds when the tag comes within a prescribed proximity of the field generator producing the non-modulated AC magnetic field. The received signal is down-converted to baseband and processed to detect a valid AC magnetic field tone and indicate whether the tag is within a prescribed proximity of the AC magnetic field source.

19 Claims, 5 Drawing Sheets

ULTRA-SENSITIVE MAGNETIC FIELD RECEIVER CAPABLE OF OPERATING IN HIGH NOISE ENVIRONMENTS

CROSS-REFERENCE TO RELATED APPLICATION

The present application claims the benefit of co-pending U.S. Provisional Patent Application Ser. No. 60/187,573, by Donald K. Belcher et al, filed Mar. 7, 2000, entitled: "Ultra-Sensitive Magnetic Field Receiver Capable of Operating in High Noise Environments," and is a continuation-in-part of co-pending U.S. Non-Provisional patent application Ser. No. 09/759,290, filed Jan. 11, 2001, by T. Harrington et al, entitled: "Proximity-Based Magnetic Field Generator for Controlling Operation of RF Burst-Transmitting Tags of Geolocation System," (hereinafter referred to as the '290 application), each application being assigned to the assignee of the present application and the disclosures of which are incorporated herein.

FIELD OF THE INVENTION

The present invention relates in general to object geolocating and tracking systems of the type described in U.S. patent to Belcher et al, U.S. Pat. Nos. 5,920,287, and 5,995,046 (hereinafter referred to as the '287 and '046 patents, respectively), assigned to the assignee of the present application and the disclosures of which are incorporated herein, and is particularly directed to a reduced complexity, non-modulated AC magnetic field communication scheme. This non-modulated AC magnetic field communication scheme includes a ('demodulatorless') magnetic field detector, which is readily coupled with a tag transceiver unit, and responds to a narrow-band, non-modulated AC magnetic field used to communicate with the tag when the tag comes within a prescribed proximity of a tag-programming magnetic field generator.

BACKGROUND OF THE INVENTION

Figure 1:
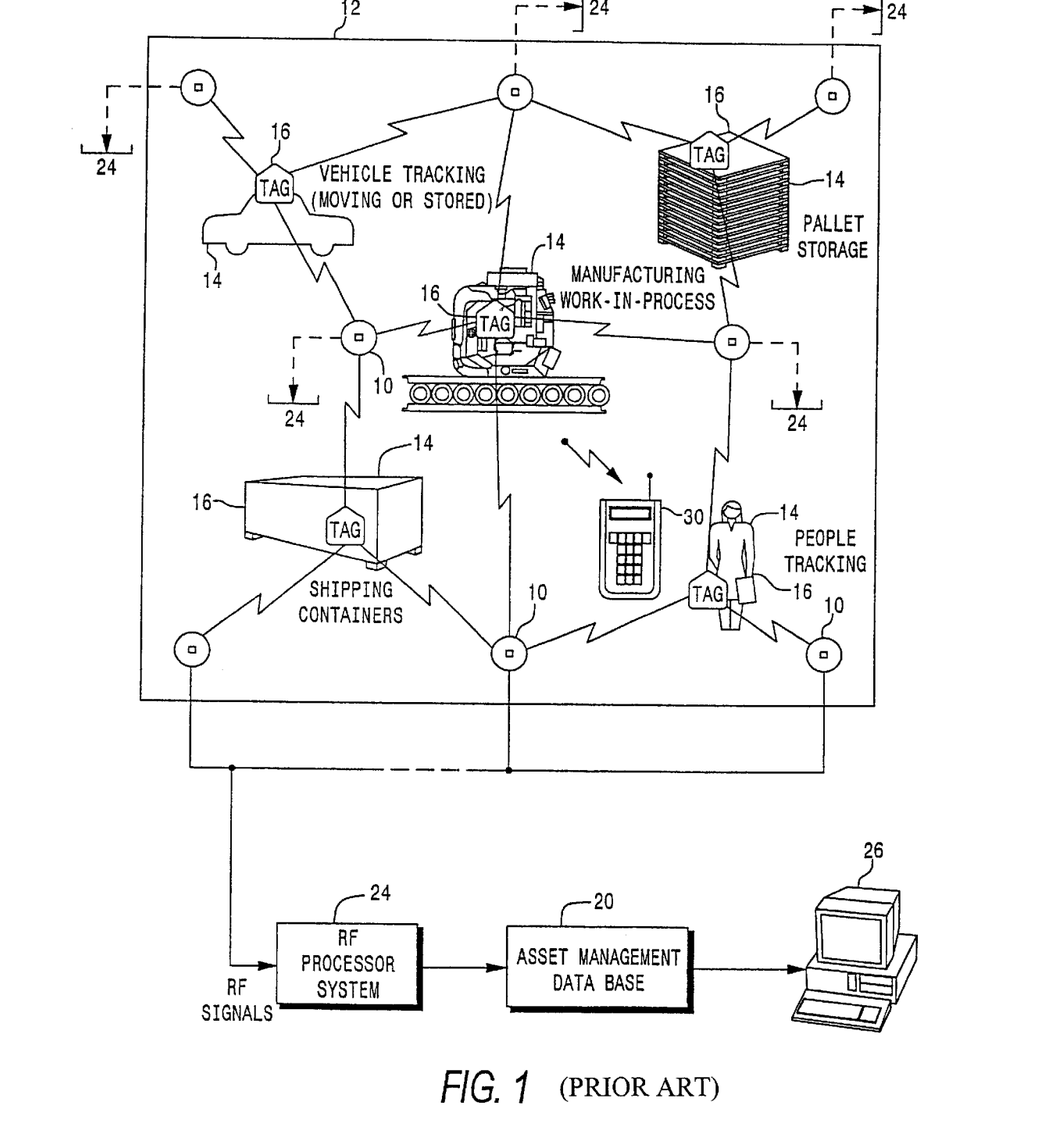
FIG. 1 diagrammatically illustrates the general architecture of a tagged object tracking and location system detailed in the U.S. patents to Belcher et al, U.S. Pat. Nos. 5,920,287, and 5,995,046.

The general architecture of the radio tagged object geolocation systems described in the above-referenced '287 and '046 patents is diagrammatically shown in FIG. 1 as comprising a plurality of tag emission readers 10 geographically distributed within and/or around an asset management environment 12. This environment contains a plurality of objects/assets 14, whose locations are to be monitored on a continuous basis and reported to an asset management database 20, which is accessible by way of a computer workstation or personal computer 26. Each of the tag emission readers 10 monitors the asset management environment for RF emissions from one or more RF-transmitter-containing tags 16 that are affixed to the objects 14. Each tag's transmitter is configured to repeatedly transmit or 'blink' a very short duration, wideband (spread spectrum) pulse of RF energy, that is encoded with the identification of its associated object and other information that may be stored in a tag memory.

These blinks or bursts of RF energy emitted by the tags are monitored by the readers 10, which are installed at fixed, and relatively unobtrusive locations within and/or around the perimeter of the environment being monitored, such as doorway jams, ceiling support structures, and the like. The output of each tag reader 10 is coupled to an associated reader processor. The reader processor correlates the spread spectrum RF signals received from a tag with a set of spread spectrum reference signal patterns, to determine which spread spectrum signals received by the reader is a first-to-arrive RF spread spectrum signal burst transmitted from the tag.

The first-to-arrive signals extracted by the reader output processors are forwarded to an object location processor within the processing subsystem 24. Using time-of-arrival differentiation of the detected first-to-arrive transmissions, the object location processor executes a prescribed multilateration algorithm to locate within a prescribed spatial resolution (e.g., on the order of ten feet) the tagged object of interest.

In their normal mode of use, the tags exhibit a prescribed operational functionality, such as transmitting or 'blinking' at a relatively slow repetition rate. The use of a relatively slow blink rate is due to the fact that most of the objects being tracked do not move frequently. However, there may be occasions where it is desired to change the operation of or otherwise communicate information to a tag, such as stopping the tag from blinking or causing it to start blinking, or to transmit additional data, such as that acquired from optional sensors or a data bus.

As another illustration, there are times when the objects to which the tags are attached are moved and may pass through one or more regions of the monitored environment where communications with the tags are desired. For example, the monitored environment may contain 'increased sensitivity' regions (such as doorways and the like) where more frequent tag transmissions are desired, in order to ensure that any objects passing therethrough can be readily tracked. One way to accomplish this particular task would be to simply program the tags to blink more frequently on a continuous basis. However, this approach is not acceptable for two reasons. First, more frequent tag transmissions on a continuous basis will shorten the battery life of the tag; secondly it would increase spectrum congestion.

In accordance with the invention disclosed in the above-identified '290 application, the above-described tag-reprogramming function is readily achieved by placing an arrangement of one or more relatively short range, modulated magnetic field proximity-based, tag-programming 'pingers' at a respective location of the monitored environment that is proximate to a region (such as a doorway) through which a tag may pass. This tag-programming pinger arrangement is operative to emit a non-propagating, modulated AC magnetic field, that is modulated with frequency shift keyed (FSK) encoding signals representative of digital data to be transmitted to the tag.

Such encoding signals may include, but are not limited to programming information, data or a stimulus, to be modulated AC magnetic field-coupled to any tag passing through that region. As a non-limiting example, tag reprogramming information may be used to cause the tag to immediately begin blinking at an increased rate for a relatively brief period of time, so as to alert the tracking system of the presence of the tag in the region. While the use of an AC magnetic field FSK-encoded using operational frequencies that are typically less than a few hundred KHz allows a large amount of data to be rapidly communicated to the tag, such frequencies are dominated by man-made and natural noise levels that limit performance.

SUMMARY OF THE INVENTION

In accordance with the present invention, the unwanted influence of such a noise-source environment upon an FSK-encoded magnetic field-based communication system is substantially diminished, by simplifying the complexity of the communication scheme to obviate the need for bandwidth that is unnecessary to achieve the transfer of a more limited amount of information. As opposed to an application in which the purpose of the communication link is to transmit 'data' (where a fairly large (data) bandwidth may be required and increases susceptibility to interference), the present invention is intended for an application where the magnetic field communication link is used for a relatively simple function that can be represented by a single frequency. An example of such a simple function includes proximity detection or transmitting a relatively simple command, where the bandwidth requirement is considerably decreased, allowing a reduced complexity communication implementation.

Pursuant to the first embodiment of the invention, a magnetic field-sensing coil is coupled to a downconverter referenced to a highly stable local oscillator producing an AC magnetic field frequency (e.g., on the order of decimal fractional multiple of 100 KHz) that is readily distinguishable from other normal factory background electrical and electronic noise. The output of the downconverter is therefore a very low frequency. This (baseband) frequency is filtered in a very narrowband lowpass filter, and applied to a valid AC magnetic field tone detection path, and a range detection path. In the valid field tone detection path, the 100 Hz signal is 'squared' by a hard limiter and applied to a digital tone filter, which counts transitions in the narrowband signal over a prescribed detection/integration interval to determines whether a valid AC magnetic field signal has been detected. The digital tone filter may alternatively be configured to operate against a plurality of tones, to accommodate reception of plural AC tone signals.

In the range detection path, which provides an analog representation of the received magnetic field signal level, the filtered signal peak-detected and coupled to a range-associated threshold detector, which indicates whether the tag is within a prescribed proximity of the AC source. This range detection output is logically combined with the tone detect signal to validate detection of the AC magnetic field tone and also that the tag is within a predetermined proximity of the AC tone field generator.

In a second embodiment of the magnetic field sensing unit, the detected signal output is digitized and processed by a digital processor which performs both digital tone detection and amplitude detection on the sample signal. The digital processor based embodiment has the ability to detect the AC field tone in the presence of noise that is hundreds of times greater than the AC field tone. This is achieved by operating components upstream of the digitizing section in a linear mode, with the processor feeding back a gain control signal to set the analog system gain prior to the digitizer. Also, in this embodiment, the received energy is processed in a very narrow bandwidth, which improves the quality of the threshold estimate. Digital processing also measures the amplitude, based on the output of the digitizer and the gain control setting. This amplitude measurement value is coupled to a digital comparator and compared against a reference number to determine range. As in the first embodiment, the range measurement is validated by combining with a valid field detection data bit.

DETAILED DESCRIPTION

Before detailing the reduced complexity magnetic field proximity-based tag programming arrangement of the present invention, it should be observed that the invention resides primarily in a magnetic field-based augmentation to the geolocation system of the type described in the above-referenced Belcher et al Patents. In particular, the present invention involves placing a relatively short range, proximity-based, AC magnetic field at a location of the monitored environment that is proximate to a region (such as a doorway) through which a tagged object may pass. The magnetic field generator is operative to generate a non-modulated AC magnetic field, whose frequency represents information, such as but not limited to programming information, such as a stimulus, that is coupled to and sensed by a 'demodulatorless' AC magnetic field-detecting receiver installed in any tag passing through the region.

As will be described, the invention is readily implemented as an arrangement of RF and magnetic field communication circuits and associated digital signal processing components and attendant supervisory control circuitry therefor, that controls the operations of such circuits and components. The configuration of such circuits components and the manner in which they interface with other communication system equipment have, accordingly, been illustrated in readily understandable block diagram format, depicting details that are pertinent to the present invention, so as not to obscure the present disclosure with details which will be readily apparent to those skilled in the art having the benefit of the description herein. Thus, the block diagram illustrations are primarily intended to show the major components of a tag-based geolocation system in a convenient functional grouping, whereby the present invention may be more readily understood.

Figure 2:
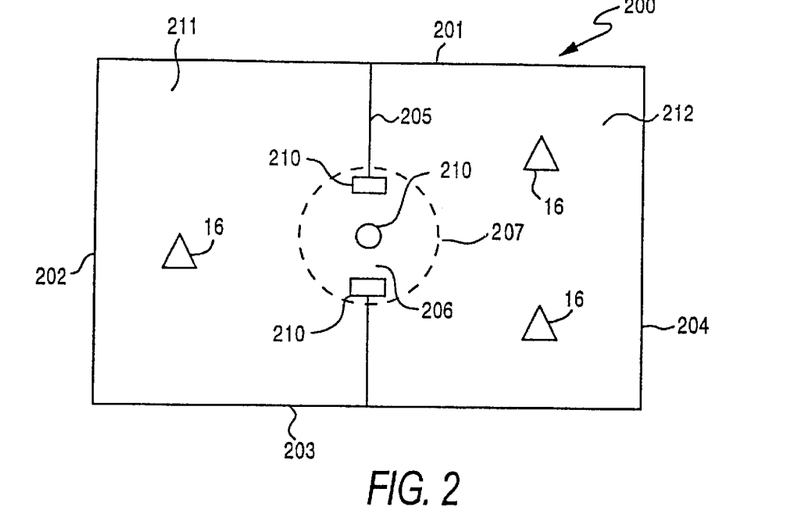
FIG. 2 is a diagrammatic plan view of a reduced complexity monitored environment in which a geolocation system of the type disclosed in the above-referenced U.S. patents to Belcher et al, and shown FIG. 1 may be installed.

Attention is now directed to FIG. 2, which is a diagrammatic plan view of a reduced complexity monitored environment 200 in which a geolocation system of the type shown in FIG. 1 and disclosed in the above-referenced '287 and '046 patents, may be installed. As described in the above-referenced '290 application, the environment 200 has a generally rectangular defined by four, rectangle-defining, perimeter walls 201, 202, 203 and 204, and also having an interior wall 205 that subdivides the environment 200 into two adjacent sections 211 and 212. In addition, the interior wall 205 is shown as having a doorway 206 that provides a passageway between sections 211 and 212.

In the present example, it will understood that the tagged objects do not move frequently (for example, the objects may be comprise an inventory of parts or pieces of equipment retained in storage) and/or the tagged objects in one of the sections 211 and 212 would normally not be expected to be moved to the other section. As such, each of the tags 16 may be programmed to normally 'blink' an encoded RF burst at a relatively slow repetition rate. However, should any tagged object be moved and pass through the doorway, it is desired to have immediate knowledge of that passage, as well as subsequent tracking of the movement of the object.

Figure 3:
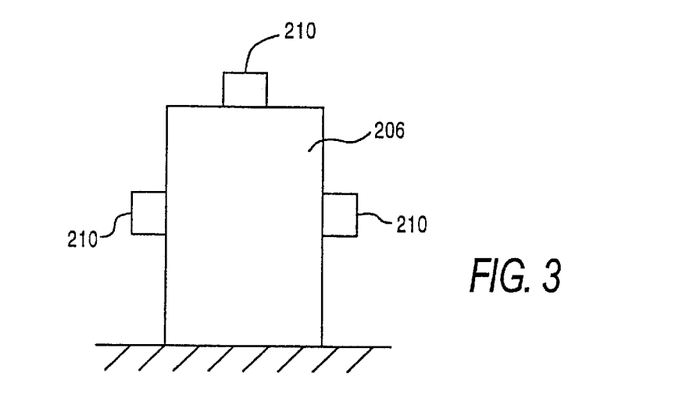
FIG. 3 is a diagrammatic elevation view of a portion of the monitored environment of FIG. 2.

To satisfy this objective, the tagged object tracking system of FIG. 1 may be augmented in two ways. First, one or more relatively short range, magnetic field proximity-based, tag-programming generators is placed proximate to the region of interest—here a region 207, shown in broken lines in the proximity of the doorway 206. As shown in FIG. 2 and in the diagrammatic elevation view of FIG. 3, a plurality of relatively reduced range magnetic field generators 210 may be placed above and along sides of the doorway 206, so as to ensure complete spatial coverage for the doorway and accommodate any orientation of the tagged objects passing through it. In an alternative configuration, the magnetic field generator may be implemented as a hand-held wand, similar to a bar code scanner, so as to provide the capability of programming a tag via a connection to a personal computer, portable data terminal, and the like, or by simply pulling a trigger on the wand.

Due to its relatively short coverage range, such a magnetic field generator is especially suited for confined space applications, such as doorways, gates, and the like. The low frequency of the AC magnetic field emitted by a respective generator is capable of penetrating thin metals such as foils, where radio signals are totally blocked. In addition, the use of a short range device means that a large number of generators and tags may be used in a single facility without interfering with one another. The second augmentation involves modifying the transceiver architecture of a respective tag to incorporate a magnetic field sensor that will enable the tag to appropriately respond to the AC magnetic field 220 generated by a respective generator (or pinger) 210.

As a further example, the magnetic field generator may be installed on a fork-lift, so that a tagged item being moved by the fork-lift will receive the increased blink rate command. This will allow continuous tracking of a tagged item, as it is being moved by the fork-lift. After the fork-lift has transported and deposited the tagged item, and then leaves the proximity of the tagged item, the tag will again resume its previous slow blink rate, thus conserving battery life.

Figure 4:
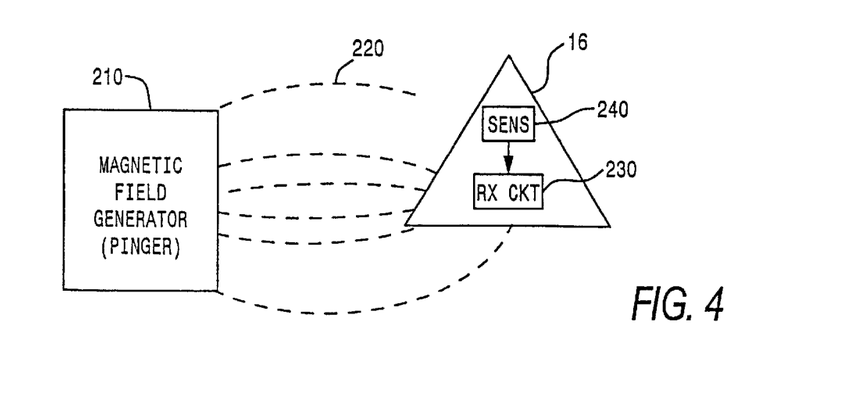
FIG. 4 diagrammatically illustrates the magnetic field coupling of an AC magnetic field generator with a magnetic field sensor of a tag transceiver.

As diagrammatically illustrated in FIG. 4, the magnetic field generator 210 is operative to generate a non-propagating, unmodulated (single frequency or continuous wave (CW)) AC magnetic field 220. As a non-limiting example, generator 210 may be of conventional construction, employing inductor (L)—capacitor (C) tank/resonant circuit, that is switchably coupled in circuit with a suitable electrical energy source (e.g., battery). Because of its simplicity and being a highly resonant circuit (since only a single frequency is needed), the circuit consumes only a minimal amount of power.

The frequency of the magnetic field representative of information intended for a respective tag 16 (that has come within the magnetic field sensing proximity of the generator 210). Since such a field theoretically has approximately zero bandwidth, the tag receiver such a signal, to be described below, for sensing such a fixed frequency magnetic field can have a near zero bandwidth. As a non-limiting example, the CW magnetic field produced by generator 210 may have a relatively low frequency within a range of frequencies (e.g., 9–135 KHz) routinely used for induction transmissions world wide.

In order to provide the ability to selectively program its output frequency, the AC magnetic field generator may be configured as a frequency selectable device, of the type disclosed in the above-referenced '290 application for FSK applications, but operated in a selectable, fixed frequency mode. A first embodiment of such a circuit, shown in FIG. 5, includes an analog section 212, which is configured to generate a non-propagating AC magnetic field, and an associated digital section 214 that is operative to controllably set the resonant frequency of magnetic coil—capacitor components of the analog section 212 at a precisely calibrated or pre-tuned frequency in accordance with digital data supplied to the digital section.

Figure 5:
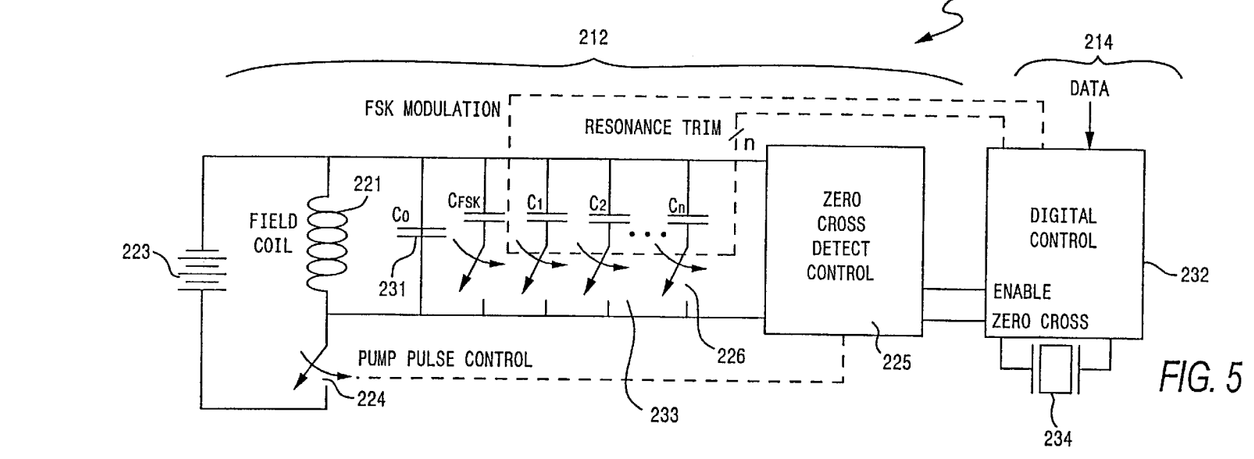
FIG. 5 shows a first embodiment of an AC magnetic field generator.

The analog section 212 includes a magnetic field coil 221, to which a relatively large amplitude energizing current is supplied by a DC power supply or battery 223, is coupled to the field coil 221 by way of a 'pumping' switch 224. The magnetic field coil 221 is small compared to the operating frequency and the volumetric extent of the resonant magnetic field 220 produced thereby, so that the energy in the magnetic field that emanates from and surrounds the field coil 221 is not propagated, but is physically confined relatively close to the coil, as in a typical solenoid. Because the curving electromagnetic field generated by the generator is virtually impossible to defeat by tag orientation, it provides a substantially strong coupling of the AC magnetic field with the sensing coil of a tag proximate thereto. As described above with reference to FIG. 3, distributing one or more such magnetic field generators around a region of interest (such as above and alongside a doorway) ensures complete coverage of the region.

A zero-crossing detector 225 is coupled in parallel with a resonant ('tank' or 'ringing') circuit formed by the field coil 221 and one or more capacitors 231 of a capacitor circuit 233, and is used to periodically close open the pumping switch 224 in a fly-back manner, to provide a DC current boost to the coil 221 from the battery, compensating for resistive losses in the ringing circuit. The pumping signal generated by the zero-crossing detector 225 provides for switch closure at or near the point at which the resonating current signal in the tank circuit crosses zero. This pumping signal has a duration for a small fraction of a cycle of the resonant frequency of the magnetic field, and may be optimized for the intended range of operation of the generated field and the size of the coil 221. Selective closure of one or more of the switches 226 by the supervisory microcontroller 232 in accordance with a frequency-selecting digital code may be employed to place two or more capacitors 231 in parallel with the coil, thereby controllably tuning the resonant frequency of the magnetic field.

The clock reference employed by the microcontroller 232 to control the pumping switch 224 may use the coil 221 and one of the capacitors of the tank circuit, or a separate clock source, such as a crystal oscillator 234. This separate clock source serves as a reference for the microcontroller 232 for measuring the resonant frequency established by the tank circuit at transmitter initialization and periodically thereafter. This ensures that the resonant frequency is at the intended value.

During calibration, a small valued 'trim' capacitor may be controllably switched in and out of the tank circuit to set the desired frequency of the field generator. Thereafter, the switch to the selected capacitor is closed to establish the desired output frequency of the generator. The use of a set of trim capacitors allows the generator's output frequency to be very precisely set at a frequency (e.g., F=100.2 KHz) that is readily distinguishable from other normal factory background electrical and electronic noise.

Figure 6:
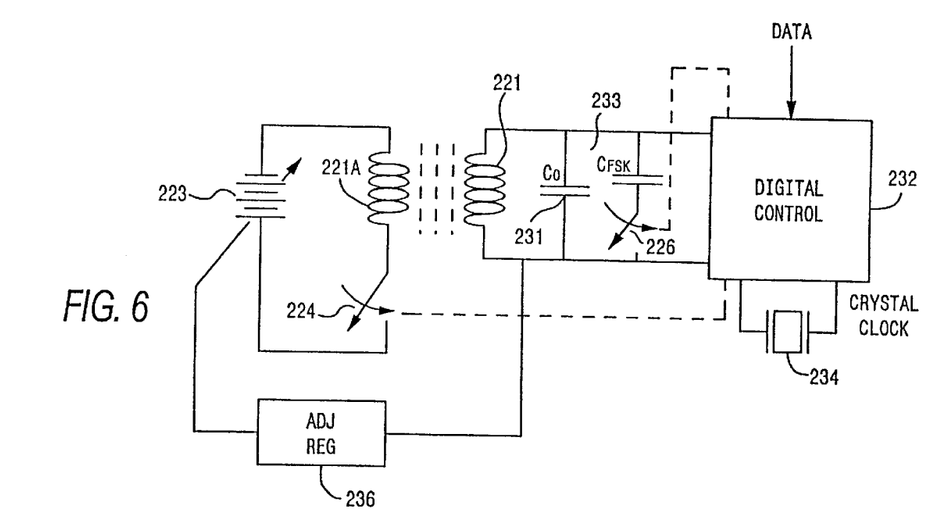
FIG. 6 shows an alternative embodiment of an AC magnetic field generator.

FIG. 6 shows an alternative, reduced hardware complexity embodiment of the magnetic field generator 210, that eliminates some of the analog circuitry of FIG. 5 at the cost of requiring accurate, temperature-stable components in the resonant LC network, and may be preferred in small battery-operated and portable applications. In this alternative embodiment, a relatively low inductance, auxiliary coil 221A is transformer-coupled with the high inductance field coil 221. The auxiliary coil 221A is coupled to the battery through the pumping switch 224, which is controlled directly by the microcontroller 232. As the tank circuit is DC-isolated from the pumping switch, a relatively simple switch can be used.

Each of the magnetic field generator configurations of FIGS. 5 and 6, when employed in heavy industrial (high noise environment) applications, benefits from a power control loop, to allow for correction of the magnetic field level, thereby maintaining communication performance, when the system is affected by the proximity of a large metallic body such as a passing automobile or forklift. For this purpose, the power source 223 may be adjusted by a control signal generated by monitoring the level of the voltage present in the resonant LC circuit. The power source 223 may be controllably varied by means of an adjustable regulator 236, wherein the detected resonant circuit voltage is fed back via a feed back link to the adjustment portion of the regulator, to form a closed control loop.

Figure 7:
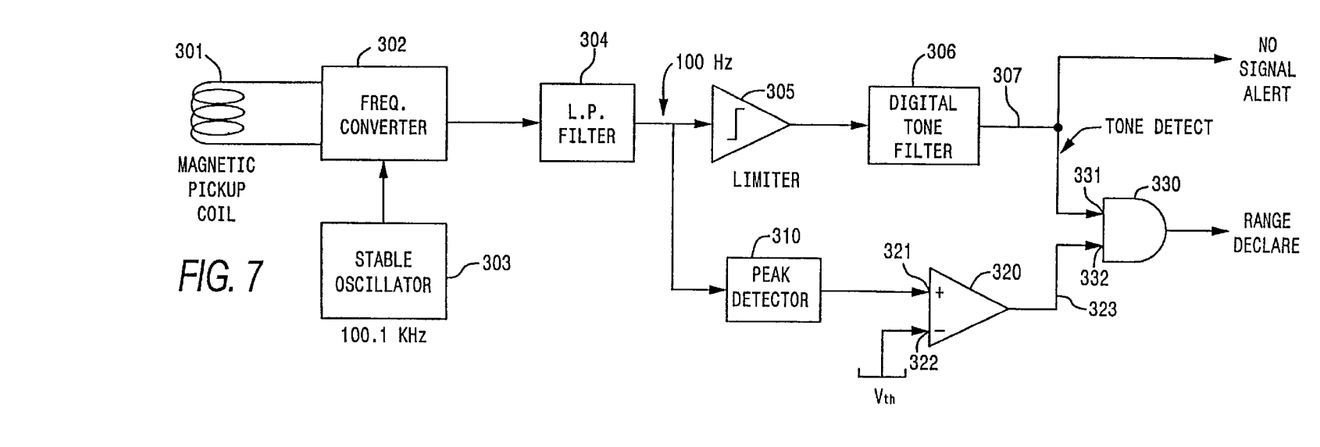
FIG. 7 diagrammatically illustrates the configuration of an AC magnetic field receiver unit in accordance with a first embodiment of the present invention.

FIG. 7 diagrammatically illustrates the circuit architecture of a first embodiment of a magnetic field sensing unit 240 for a respective tag. Advantageously, this scheme uses a minimum of power and can be implemented using low cost chip technology. The unit comprises a magnetic field-sensing coil 301, which is coupled to a downconverter (mixer) 302, that is referenced to a highly stable local oscillator 303, such as one producing the above-referenced, non-limiting example of an AC magnetic field frequency F=100.1 KHz. The output of downconverter 302 is therefore a very low (baseband) frequency (100 Hz in the present example) which is filtered in a very narrowband lowpass (100 Hz) filter 304 (such as a solid state RC filter), to produce the desired narrowband (here 100 Hz) frequency. It should be noted that the receive bandwidth may be as small as desired to provide the necessary detectability in the presence of noise. This is only limited by detection time, as decreasing bandwidth results in increasing detection (integration) time.

This narrowband sinusoid signal is applied to each of a hard limiter 305 (such as a solid state gain stage) of a valid AC magnetic field tone detection path, and a peak detector (e.g., diode) 310 of a range detection path. In the valid field tone detection path, the 'squared' 100 Hz signal produced by the hard limiter 305 is coupled to a digital tone filter 306. The digital tone filter may be implemented as a simple digital counter, which is operative to count the 100 Hz square wave signal from the limiter during a prescribed interval.

If, in the course of its enable interval (which effectively represents a valid AC field detect integration interval), the contents of the counter 306 reach a prescribed count value, its output changes state (e.g., goes high (logical '1') on line 307, to indicate that a valid AC magnetic field signal has been detected. Line 307 is coupled to downstream tag circuitry, such as the transceiver shown in FIG. 9, as will be described, and to a first input 331 of an AND gate 330.

Rather than detect a single tone, the digital tone filter may be configured to operate against a plurality of AC tone signals. For example, if the field generator were operative to transmit 100.11 KHz, the received tone would again be the difference frequency, here 110 Hz. Employing digital tone circuitry that distinguishes between different tones, thus provides for receipt of a plurality of different commands conveyed by the respective AC field signals.

In the range detection path, the output of the peak detector 310 is coupled to a first input 321 of a threshold detector 320, a second input 322 of which is coupled to receive a reference (threshold) voltage Vth representative of a prescribed range or proximity to the source. This range detection path serves as an analog representation of the received magnetic field signal level. Signal level with induction coupling provides a practical way to determine distance or proximity, since the magnetic field strength varies inverse exponentially to a relatively high exponential power, typically range−3.

The output 323 of threshold detector 320 therefore indicates whether the tag is within a prescribed proximity of the AC source. This output is coupled to a second input 332 of AND gate 330, the output of which is also coupled to downstream tag circuitry. AND gate 330 provides a relatively simple means to indicate that a valid AC magnetic field tone has been detected and that the tag is within a predetermined proximity of the field generator. Namely, by combining the output of the tone detector and the output of the amplitude/strength detector, AND gate 330 produces a 'range declare' bit that functions to indicate a range threshold has been crossed that is guaranteed to be the desired signal. If the desired signal is lost, for example due to noise, a 'no signal alert' on output line 307 would operate to indicate that validity of the 'range declare' bit is suspect.

Figure 8:
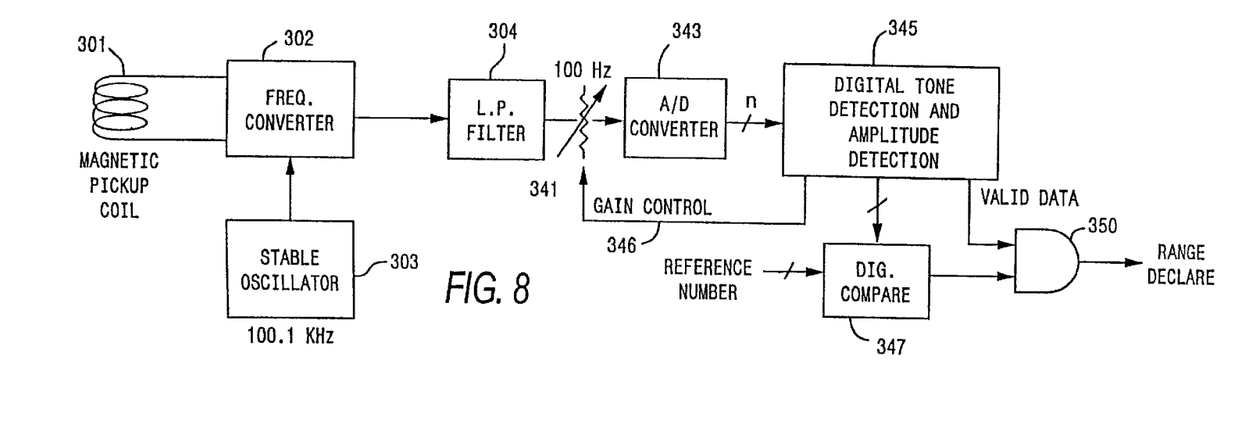
FIG. 8 diagrammatically illustrates the configuration of an AC magnetic field receiver unit in accordance with a second embodiment of the present invention.

FIG. 8 diagrammatically illustrates the circuit architecture of a second, enhanced performance embodiment of the magnetic field sensing unit 240 for a respective tag. In this embodiment, the detected signal output is processed digitally. For this purpose, the narrowband sinusoid signal output by the filter 304 is coupled through a variable gain circuit 341 and sampled by an analog-to-digital converter (ADC) 343 to a prescribed (n-bit) code resolution. The digitized sample is coupled to a digital processor 345, which performs both digital tone detection and amplitude detection on the sample signal.

The digital processor based embodiment of FIG. 8 has the ability to detect the AC field tone in the presence of noise that is hundreds of times greater than the tone. This is achieved by operating the components upstream of the ADC 343 in a linear mode, by the processor 345 feeding back a gain control signal shown at 346 to set the analog system gain of variable gain circuit 341 just prior to the ADC 345. Secondly, digitally processing the signal integrates the energy only in a very narrow (e.g. 5 Hz) bandwidth, to further improve the quality of the threshold estimate. This is in contrast to the first embodiment of FIG. 7, in which the 50 Hz bandwidth is limited, thus setting a lower bound on sensitivity.

The use of a digital processing embodiment also functions to measure the amplitude, based on the output of the ADC 345 and the gain control setting. This amplitude measurement value is coupled to a digital comparator 347 and compared against a reference number to determine range. As in the embodiment of FIG. 7, the range declaration is validated by combining it in an AND gate 350 with a signal detection (valid data) bit.

Figure 9:
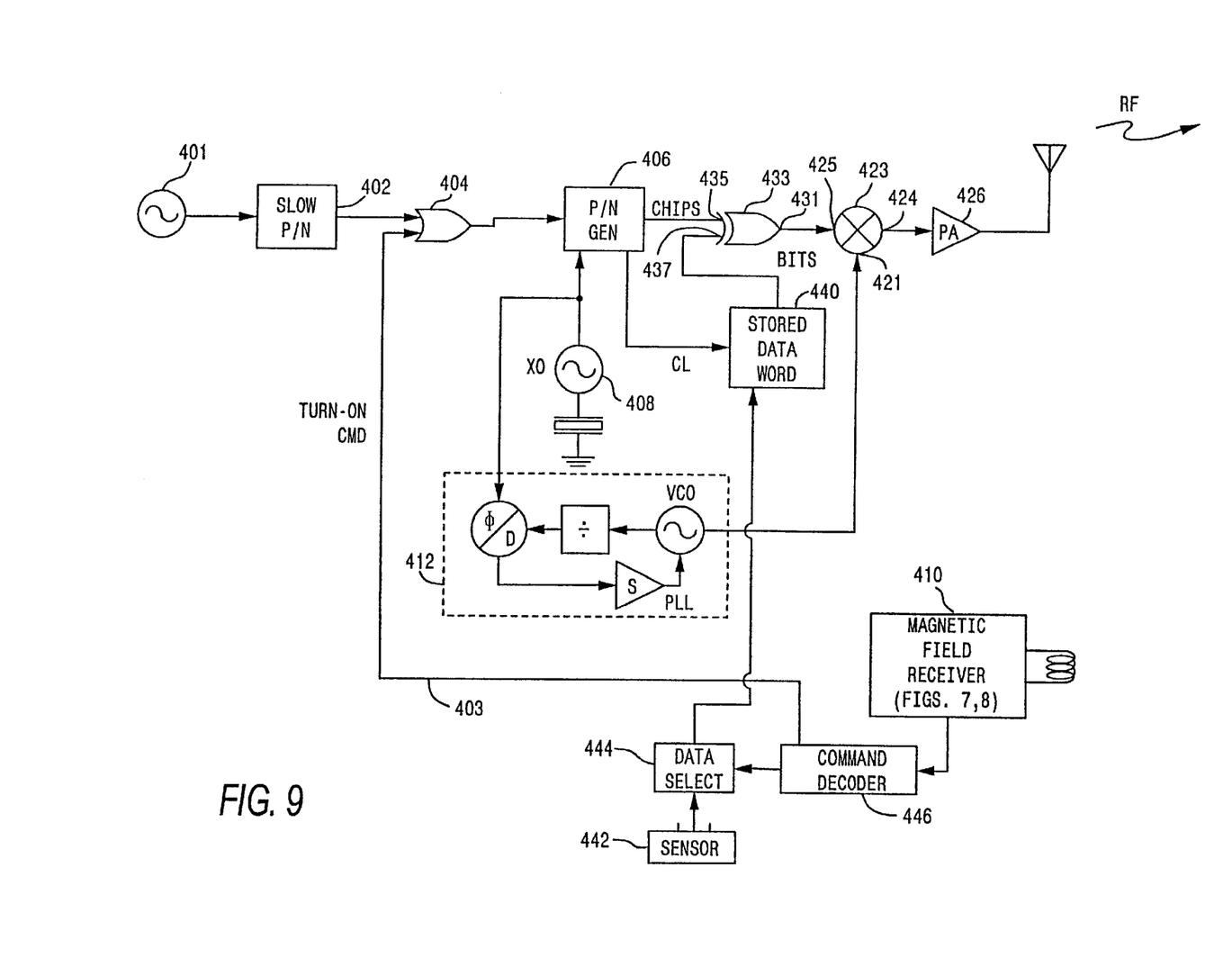
FIG. 9 shows the manner in which a tag transceiver unit of the radio location and tracking system of the Belcher et al patents may be modified to incorporate an Ac magnetic field receiver of the present invention.

FIG. 9 shows the manner in which the circuit architecture of a tag transceiver employed in the radio location and tracking system of the type detailed in the above-referenced '287 and 046 patents (such as that shown in FIG. 4 thereof) may be modified to incorporate a magnetic field sensing unit of the type described above with reference to FIGS. 7 and 8. As in the tags described in the patents, the augmented tag transceiver comprises an oscillator 401, the output of which is coupled to a variable pseudo random (PN) pulse generator 402. The PN generator 402 is normally operative to generate series of relatively low repetition rate (for example, from tens of seconds to several hours), randomly occurring 'blink' pulses that are coupled through an OR gate 404 to a high speed PN spreading sequence generator 406.

These blink pulses define when the tag randomly transmits or 'blinks' bursts of wideband (spread spectrum) RF energy to be detected by the tag transmission readers, in order to locate and identify the tag using time-of-arrival geometry processing of the identified first-to-arrive signals, as described above. The PN generator 402 is also coupled to receive a control signal on line 403 from a command decoder 446, which is coupled to the outputs of the magnetic field sensing circuitry of the type shown in FIGS. 7 and 8, and shown generally at 410.

In response to the magnetic field sensing circuitry 410 detecting an AC magnetic field tone, as described above, the command decoder 446 may take action as described above, such as providing a blink rate change signal (e.g., change the binary state of line 403 from its default, low blink rate representative level to a high blink rate logic level) to the variable PN generator 402. This increases the pulse rate at which 'blink' pulses are produced by generator and coupled through OR gate 404 to the high speed PN spreading sequence generator 406. The tag now blinks at an increased rate, to alert the tracking system of the proximity of the tagged object to an 'increased sensitivity' region where the magnetic field generator is installed.

Upon receipt of an enabling 'blink' pulse, the high speed PN spreading sequence generator 406 generates a prescribed spreading sequence of PN chips. The PN spreading sequence generator 406 is driven at the RF frequency output of a crystal oscillator 408. This crystal oscillator provides a reference frequency for a phase locked loop (PLL) 412, which establishes a prescribed output frequency (for example a frequency of 2.4 GHz, to comply with FCC licensing rules). The RF output of PLL 412 is coupled to a first input 421 of a mixer 423, the output 424 of which is coupled to an RF power amplifier 426. Mixer 423 has a second input 425 coupled to the output 431 of a spreading sequence modulation exclusive-OR gate 433. A first input 435 of the exclusive-OR gate 431 is coupled to receive the PN spreading chip sequence generated by PN generator 406. A second input 437 of exclusive-OR gate 431 is coupled to receive the respective bits of data stored in a tag data storage memory 440, which are clocked out by the PN spreading sequence generator 406.

As described in the '287 and '046 patents, the tag memory 440 may comprise a relatively low power, electrically alterable CMOS memory circuit, which contains a multibit word representative of the identification of the tag. The tag memory 440 may also store additional parameter data, such as that provided by an associated sensor (e.g., a temperature sensor) 442 installed on or external to the tag, and coupled thereto by way of a data select logic circuit 444, which is coupled to the command decoder 446. The data select logic circuit 444 may implemented in gate array logic and is operative to append any information it receives to that already stored in the tag memory 440. It may also selectively couple sensor data to memory, so that the tag will send only previously stored data. It may also selectively filter or modify data output by the command decoder 446.

When a valid magnetic field produced from a magnetic field generator is detected by the receiver 410, the command bits are written into the tag memory 440, via the data select logic circuit 444. The command decoder 446 also couples a signal through OR gate 404 to the enable input of the PN generator 406, so that the tag's transmitter will immediately generate a response RF burst, in the same manner as it randomly and repeatedly 'blinks' a PN spreading sequence transmission containing its identification code and any parameter data stored in memory 440, as described above.

As will be appreciated from the foregoing description, the unwanted influence a noise-source environment upon a modulated (e.g., FSK-encoded) magnetic field-based communication system is substantially diminished by the non-modulated AC magnetic field communication scheme of the present invention, which employs a demodulatorless magnetic field detector. This detector is configured to respond to a narrow-band, non-modulated AC magnetic field used to communicate with the tag, when the tag comes within a prescribed proximity of a tag-programming magnetic field generator. Once it has downconverted the frequency of the sensed field to baseband, the detector employs reduced complexity processing circuitry to detect a valid AC magnetic field tone and indicate whether the tag is within a prescribed proximity of the AC magnetic field source.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of controlling the operation of a system for geolocating objects within a monitored environment, wherein RF transmissions from tags associated with said objects are detected at a plurality of spaced apart monitoring locations containing tag transmission readers, and outputs of said tag transmission readers are processed to geolocate said tags and thereby their associated objects within said monitored environment, said method comprising the steps of:

(a) generating, from at least a location of the monitored environment that is proximate to a region which a tagged object may enter, an unmodulated magnetic field having a constant frequency representative of information intended for a tag entering said region; and (b) at a tag that has entered said region, detecting said unmodulated magnetic field and causing said tag to perform a prescribed function.

2. The method according to claim 1, wherein step (b) comprises processing a detected unmodulated magnetic field to determine whether said tag is within a prescribed proximity of said location.

3. The method according to claim 2, wherein step (b) comprises processing said detected unmodulated magnetic field to validate whether said detected magnetic field is a valid unmodulated magnetic field as generated in step (a).

4. The method according to claim 1, wherein step (b) comprises processing a detected unmodulated magnetic field to validate whether the detected magnetic field is a valid unmodulated magnetic field as generated in step (a).

5. The method according to claim 1, wherein step (b) comprises downconverting the frequency of a detected unmodulated magnetic field to baseband, and processing the downconverted baseband signal to determine whether the detected magnetic field is a valid unmodulated magnetic field as generated in step (a), and to determine whether said tag is within a prescribed proximity of said location.

6. The method according to claim 1, wherein step (a) comprises generating a plurality of unmodulated magnetic fields having respectively different constant frequencies representative of different information intended for a tag entering said region, and step (b) comprises detecting said unmodulated magnetic fields, so as to distinguish among the frequencies thereof.

7. An arrangement for controlling the operation of a system for geolocating objects within a monitored environment, wherein RF transmissions from tags associated with said objects are detected at a plurality of spaced apart monitoring locations containing tag transmission readers, and outputs of said tag transmission readers are coupled to an object location subsystem which processes outputs of said tag transmissions to geolocate said tags and thereby their associated objects within said monitored environment, said arrangement comprising:

at least one magnetic field generator located proximate to a region which a tagged object may enter, and being operative to generate an unmodulated magnetic field having a constant frequency representative of information intended for a tag entering said region; and a magnetic field receiver installed on said tag and being operative to detect said unmodulated magnetic field and causing said tag to perform a prescribed function.

8. The arrangement according to claim 7, wherein said magnetic field receiver is operative to process a detected unmodulated magnetic field to determine whether said tag is within a prescribed proximity of said at least one magnetic field generator.

9. The arrangement method according to claim 8, wherein said magnetic field receiver is operative process said detected unmodulated magnetic field to validate whether said detected magnetic field is a valid unmodulated magnetic field as generated by said at least one magnetic field generator.

10. The arrangement according to claim 7, wherein said magnetic field receiver is operative to process a detected unmodulated magnetic field to validate whether the detected magnetic field is a valid unmodulated magnetic field as generated by said at least one magnetic field generator.

11. The arrangement according to claim 7, wherein said magnetic field receiver is operative to downconvert the frequency of a detected unmodulated magnetic field to baseband, and to process the downconverted baseband signal to determine whether the detected magnetic field is a valid unmodulated magnetic field as generated by said at least one magnetic field generator, and whether said tag is within a prescribed proximity of said at least one magnetic field generator.

12. The arrangement according to claim 7, wherein said at least one magnetic field generator comprises a plurality of magnetic field generators that generate a plurality of unmodulated magnetic fields having respectively different constant frequencies representative of different information intended for a tag entering said region, and said magnetic field receiver is operative to detect said unmodulated magnetic fields to distinguish among frequencies thereof.

13. An arrangement according to claim 7, wherein said magnetic field receiver is operative to cause said tag to change the repetition rate of RF transmissions therefrom.

14. A magnetic field receiver for use with a tag associated with an object to be tracked by a geolocation system containing at least one magnetic field generator, located proximate to a region which a tagged object may enter and being operative to generate an unmodulated magnetic field having a constant frequency representative of information intended for a tag entering said region, said magnetic field receiver comprising:

a magnetic field detector that is operative to detect said unmodulated magnetic field; and a processing circuit, coupled to said magnetic field detector and being operative to validate whether said detected magnetic field is a valid unmodulated magnetic field as generated by said at least one magnetic field generator.

15. The magnetic field receiver according to claim 14, wherein said processing circuit is operative to determine whether said tag is within a prescribed proximity of at least one magnetic field generator.

16. The magnetic field receiver according to claim 14, wherein said processing circuit is operative to downconvert the frequency of a detected unmodulated magnetic field to baseband, and to process the downconverted baseband signal to determine whether the detected magnetic field is a valid unmodulated magnetic field as generated by said at least one magnetic field generator, and whether said tag is within a prescribed proximity of said at least one magnetic field generator.

17. The magnetic field receiver according to claim 14, wherein said at least one magnetic field generator comprises a plurality of magnetic field generators that generate a plurality of unmodulated magnetic fields having respectively different constant frequencies representative of different information intended for a tag entering said region, and said processing circuit is operative to detect said unmodulated magnetic fields to distinguish among frequencies thereof.

18. The magnetic field receiver according to claim 14, wherein said processing circuit is operative to generated an output that causes said tag to change the repetition rate of RF transmissions therefrom.

19. The magnetic field receiver according to claim 14, wherein said processing circuit is operative to generate an output that causes said tag to increase the repetition rate of RF transmissions therefrom while said tag is proximate to said region, and to cause said tag to revert to its previous repetition rate after said tag is no longer proximate to said region.

* * * * *